March 8, 1949.  G. E. PRIDE  2,463,906
APPARATUS AND METHOD FOR MAKING OPTICAL DEVICES
Filed April 20, 1944  3 Sheets-Sheet 1
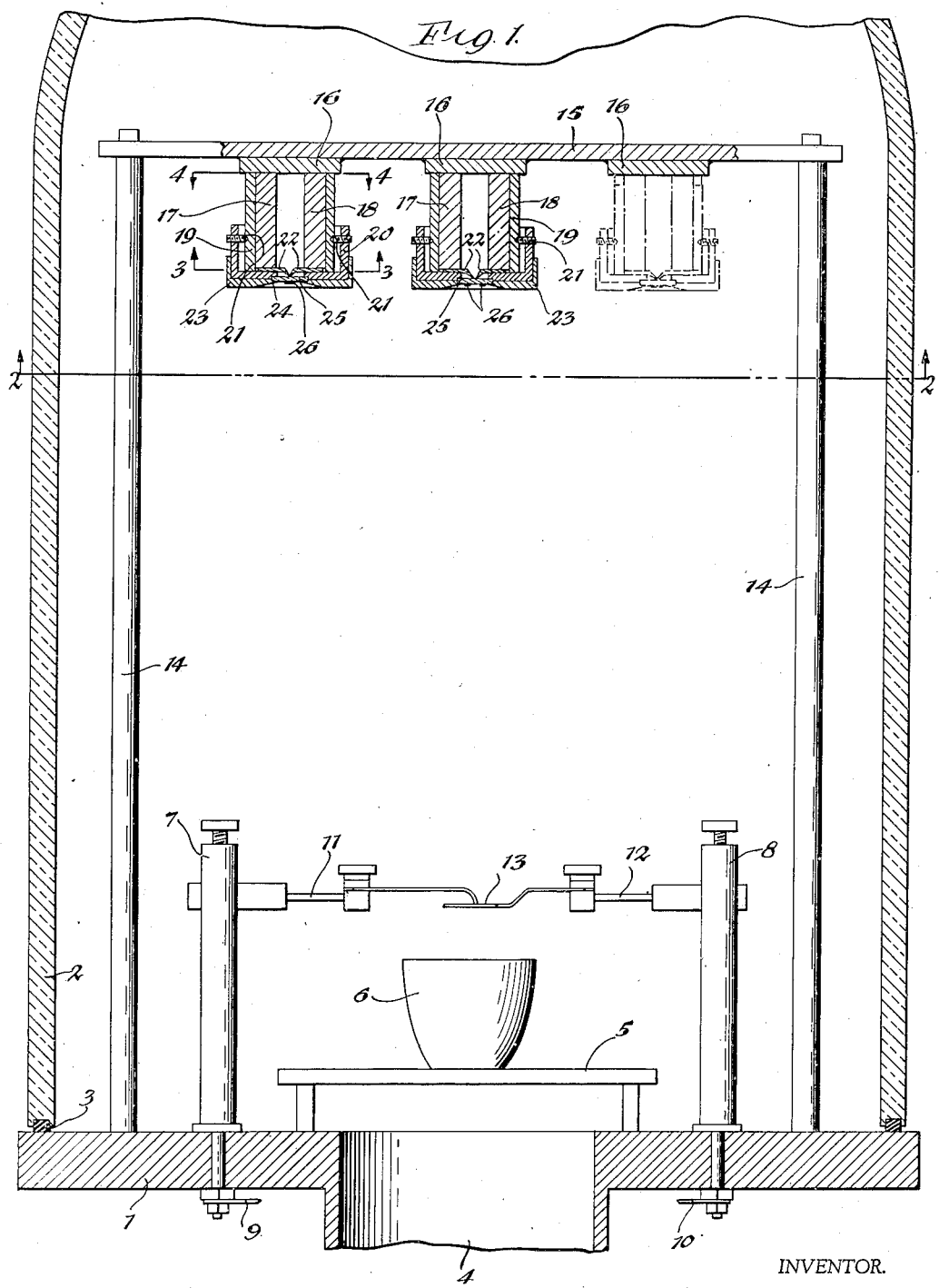
INVENTOR.
GILBERT E. PRIDE
BY Raymond A. Paquin
ATTORNEY March 8, 1949.   G. E. PRIDE   2,463,906
APPARATUS AND METHOD FOR MAKING OPTICAL DEVICES
Filed April 20, 1944   3 Sheets-Sheet 2
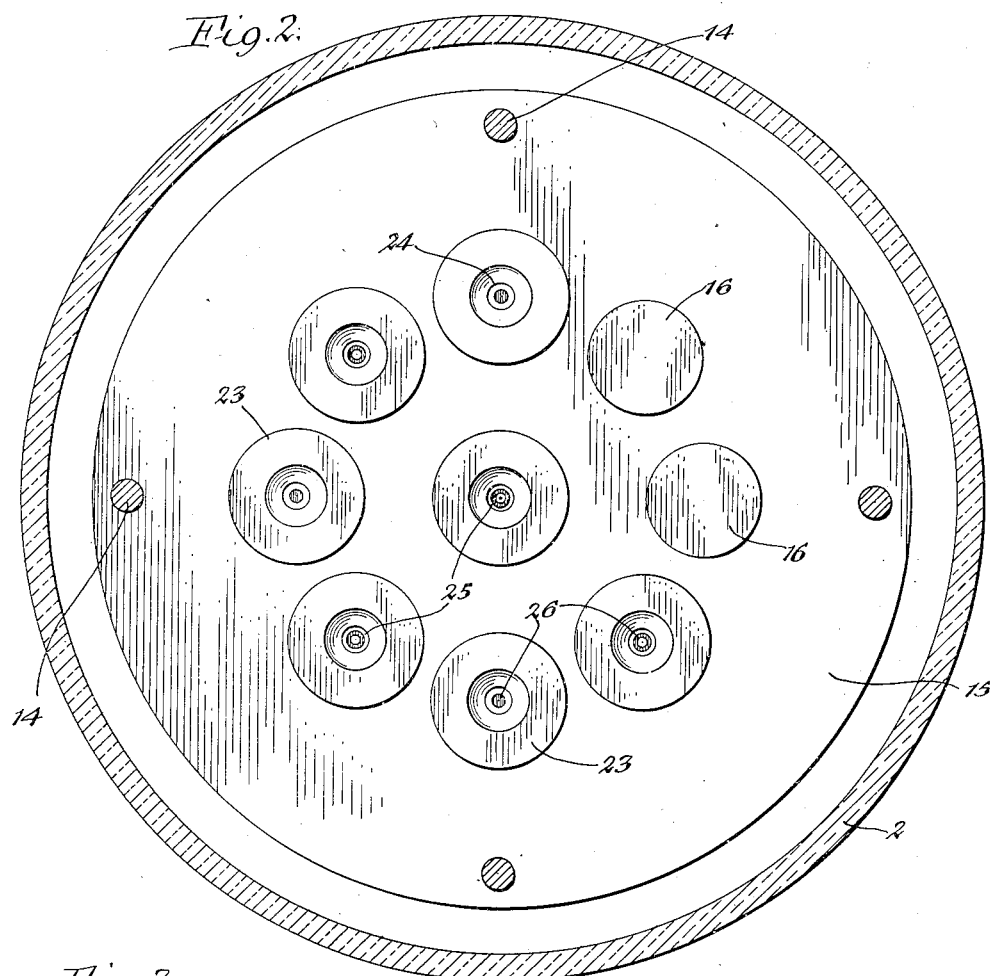
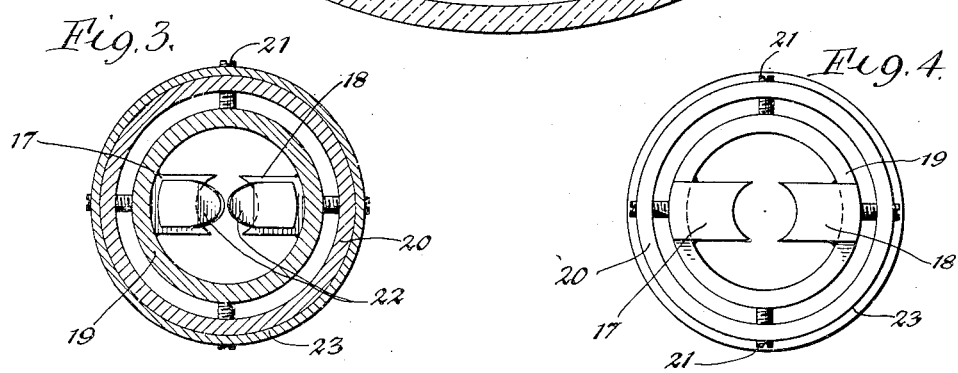
INVENTOR.
GILBERT E. PRIDE
BY
ATTORNEY

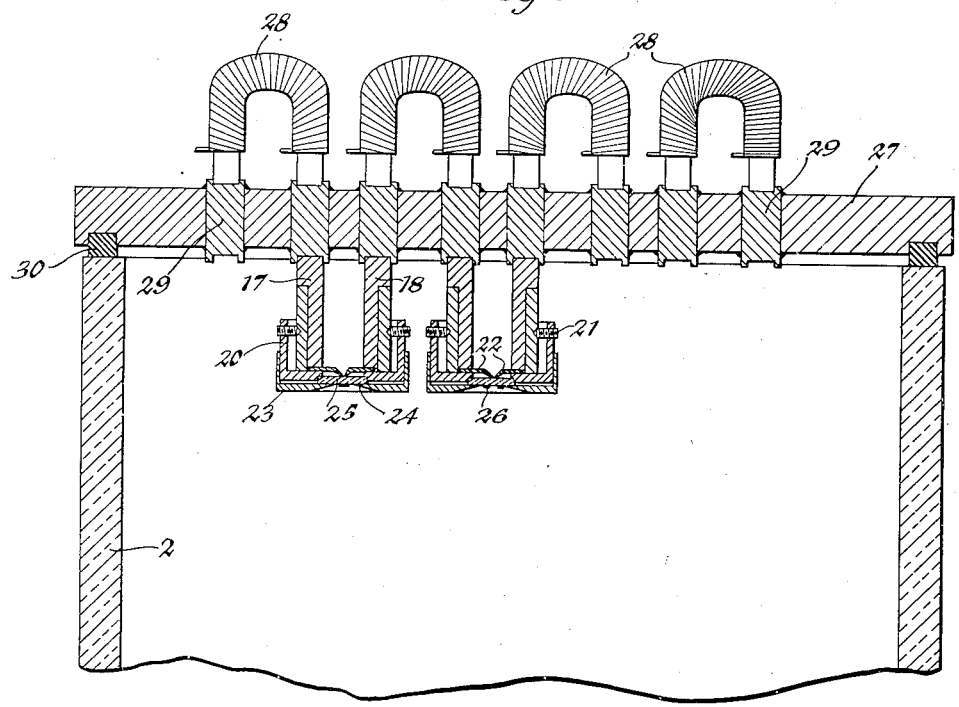
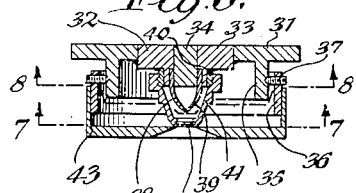
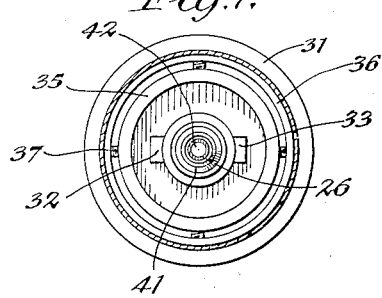
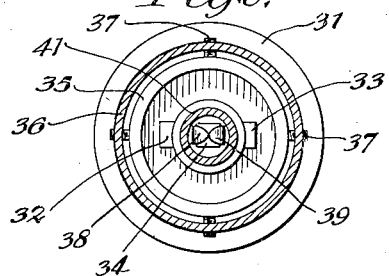
INVENTOR.
GILBERT E. PRIDE

Patented Mar. 8, 1949

2,463,906

UNITED STATES PATENT OFFICE 2,463,906

APPARATUS AND METHOD FOR MAKING OPTICAL DEVICES

Gilbert E. Pride, Buffalo, N. Y., assignor, by mesne assignments, to American Optical Company, Southbridge, Mass., a voluntary association Application April 20, 1944, Serial No. 531,932

6 Claims. (Cl. 117—38)

This invention relates to new and improved apparatus and process for making coatings of desired pattern or outline on the surface of an article. An example of an article which may be coated in accordance with the present invention is the type of light modifying means described and claimed in the application of Osterberg et al. filed August 28, 1942, Serial No. 456,726 and which has matured into Patent 2,427,689, issued September 23, 1947.

An object of the invention is to provide new and improved means and method for masking with accuracy a predetermined portion of an article while depositing a coating on the article, the mask being magnetically retained in masking relation to the surface being coated.

Other objects and advantages of the invention will be apparent from the following description taken in connection with the accompanying drawings. It will be understood that many changes may be made in the details of construction, arrangement of parts and steps of the process without departing from the spirit of the invention as expressed in the accompanying claims. I, therefore, do not wish to be limited to the exact details of construction, arrangement of parts and steps of the process shown and described as the preferred form and process have been given by way of illustration only.

Referring to the drawings:

Fig. 1 is a sectional view of an apparatus embodying the invention;

Fig. 2 is a sectional view taken on line 2—2 of Fig. 1 looking in the direction of the arrows;

Fig. 3 is a detail sectional view on line 3—3 of Fig. 1 looking in the direction of the arrows;

Fig. 4 is a detail sectional view taken on line 4—4 of Fig. 1 looking in the direction of the arrows;

Fig. 5 is a fragmentary view similar to Fig. 1 but showing a further form of the invention;

Fig. 6 is a sectional view of another form of the support;

Fig. 7 is a sectional view taken on line 7—7 of Fig. 6 looking in the direction of the arrows; and Fig. 8 is a sectional view taken on line 8—8 of Fig. 6 looking in the direction of the arrows.

The vacuum apparatus shown in Figs. 1 and 2 comprises a base 1 on which is positioned the bell jar or the like 2 to form the vacuum chamber.

Between the lower edge of the bell jar 2 and the surface of the base 1 is positioned the rubber gasket or sealing member 3.

The base 1 is provided with the opening 4 which is connected to a vacuum pump for evacuating the vacuum chamber and over this opening 4 is positioned the support 5 for supporting the crucible 6 which is adapted to contain the coating material to be evaporated.

The electrodes 7 and 8 are provided and have extensions extending through the base 1 and adapted to receive current from the leads 9 and 10 respectively.

The electrodes 7 and 8 are provided with the connecting portions 11 and 12 respectively connected to the opposite ends of the heating coil 13.

On the base 1 and within the vacuum chamber member 2 are provided the uprights 14 which may be of any desired number but of which four are shown in the form of the apparatus shown in Figs. 1 and 2.

Supported on the upper end of the supports 14 is the plate or support member 15. This plate or support member 15 is formed of non-magnetic material such as brass, aluminum, copper, etc. This member 15 is provided with the spacer members 16 although these members 16 may be omitted if desired.

The spacer members 16 may be secured to the support 15 by welding, soldering or other suitable processes. The spacer member 16 may be of magnetic material or non-magnetic material as desired.

Extending from the spacer members 16 are the permanent magnet members 17 and 18, one pair being provided for each spacer member 16. These magnet members 17 and 18 may be secured to the spacer member 16 or where the spacer member 16 is not employed, directly to the support 15 by welding, soldering or the like or where the magnetic spacer member 16 is employed they may be retained in contact therewith by means of the magnetic force exerted by said members 17 and 18.

Surrounding said magnet members 17 and 18 is provided the support member 19 which is secured to the outer surfaces of the members 17 and 18.

Surrounding the member 19 is provided the centering cap 20 which is held in position by the set screws 21 which also act to center the centering cap 20 by adjustment of said screws 21. The centering cap 20 has the central opening adapted to be placed in alignment with the space between the magnet members 17 and 18 and between the cap member 20 and end faces of the magnets 17 and 18 are provided the adjustable magnet tips 22. These magnet tips 22 may be retained in position by the magnets 17 and 18 and separately centered or they may be secured in some mechanical device having centering screws for adjustment of these said adjustable magnet tips.

Over the end of the centering cap 20 is positioned a spring retaining cap 23 adapted to be retained over the end of the centering cap 20 by friction.

The retaining cap 23 has a central opening with a peripheral flange 24 adapted to support the object, the surface of which is to be coated, between said flange 24 and the surface of the centering cap 20 which may be counter sunk to form a recess or seat for the article to be coated if desired.

Over hat portion of the surface of the article to be coated 25, on which it is desired not to place a coating there is positioned a thin shield member 26 of a magnetic material.

It is pointed out that by proper adjustment of the adjustable magnetic tips 22, upon placing the magnetic shield member 26 on the surface of the article to be coated 25, the magnetic force exerted by said adjustable magnetic tips 22 will automatically cause said shield 26 to be properly positioned over that portion of the surface of the article which is to be shielded during the coating operation and remain uncoated.

The shield member 26 may be of any desired configuration, for example a sectional element or a ring shaped element as shown in the drawings, depending upon the contour or configuration of the portion of the surface of the member 25 which it is desired to have remain uncoated.

The light modifying means described in the Osterberg et al. application above referred to are used as a part of an optical system and more particularly in a high power microscope for obtaining greater contrast in the appearance of the material being observed by the microscopist. This use entails accuracy in the light modifying means to a degree which requires great fidelity in reproducing the outline of a shield member 26. Accordingly, a shield member 26 which is ring-shaped must be completely isolated since the shadow of a support extending laterally from the ring-shaped shield member 26 would have its effect in the coating of the article 25. The use of magnetic force in maintaining the shield member 26 in position beneath the exposed surface of the article 25 has particular utility in the accurate coating of a light modifying element whose use entails the high degree of accuracy required for the parts of a microscope. By clamping the shield member 26 in position magnetically, the uncoated portion of the surface of the article 25 remains completely isolated and at the same time the shield member 26 is securely maintained in accurate position without marring the surface of the article to be coated 25.

In the apparatus shown in Fig. 5 the support 27 of non-magnetic material and the electromagnets 28 are provided for providing the magnetic force. If desired permanent magnets may be used in place of the electromagnets 28.

Extending through the support 27 are the extensions or pole pieces 29 to which the various pairs of magnets 17 and 18 may be attached depending upon the location of the north and south poles of the magnets.

In this form the support 27 also forms the top cover of the evacuated chamber and the sealing medium or gasket 30 is provided between the surface of the support 27 and the edge of the chamber member 2 to seal this connection.

In Figs. 6, 7 and 8 is shown a slightly modified form of the arrangement which form is adapted for use in the coating of surfaces of articles which are mounted in cells and cannot be removed therefrom for the coating operation.

In this form the support member 31 is provided with the permanent magnets 32 and 33 and the central spacing member 34.

The member 31 has the depending flange 35 to which is secured the centering member 36 by means of the centering screws 37 and over the member 36 is provided the spring cap or shield 43 having central openings in alignment with the object to be coated.

Between the central spacing member 34 and the ends of the magnet members 32 and 33 are positioned the adjustable magnet tips 38 and 39.

The threaded connection 40 is provided to which is connected the threaded portion of the cell or the like 41 in which is mounted the member 42 to be coated.

The shield member 26 is provided in the manner described with the previous forms.

In coating the surface of the member 25 with the present apparatus one of the discs is placed in each of the holders with the shield member 26 in proper position thereon as previously described and then current is applied to heat the coil 13 to evaporate the coating material in the crucible 6 to cause a deposit to be formed on the exposed surface of the member 25 which is not covered by the shield 26 and therefor forms a coating of desired pattern on said surface.

It is pointed out that the present apparatus is designed primarily for production use and that while a number of holders are shown that the number thereof may be increased depending upon the size of the apparatus employed and the size of the holders necessary for the discs.

It is also pointed out that the size of the opening in the cover 23 and centering cap 20 may be formed of such size as is necessary to accommodate the particular members 25 to be coated.

From the foregoing it will be seen that I have provided simple, efficient and economical means and process for obtaining all of the objects and advantages of the invention.

Having described my invention, I claim:

1. In a coating device of the vacuum distillation type having means within a hermetic enclosure for vaporizing the coating material, the combination of an article support positioned for exposing an article to the vaporized coating material, a magnetic shield for masking a portion of the surface of the article and magnetically operated means constituting the sole positioning means for retaining the shield on said surface of the article.

2. In a coating device of the vacuum distillation type having means within a hermetic enclosure for vaporizing the coating material, the combination of an article support positioned for exposing an article to the vaporized coating material, a shield for masking a portion of the surface of the article, and positioning means for positioning the article on said support, said support being provided with a magnetic clamp for clamping the shield on said surface of the article.

3. In a device of the character described having means within an enclosure for vaporizing coating material, the combination of an article support for suspending an article to be coated with a lower surface of the article exposed to the evaporized coating material, a magnetic shield for masking a portion of said lower surface and magnetic means constituting the sole support for positioning said shield beneath said lower surface.

4. In a device of the character described having means within an enclosure for vaporizing coating material, the combination with a support for an article to be coated, of a magnetic shield for masking a portion of the surface to be coated from said coating material and means positioned on the opposite side of said article from the surface to be coated for exerting a magnetic attraction through said article for clamping said shield in desired position upon said surface to be coated.

5. The process of coating an article with a pattern having an isolated uncoated portion consisting in supporting the article in an evacuated enclosure, placing a mask over and in direct contact with a portion of the article which is to remain uncoated, vaporizing a coating material, and subjecting the surface to be coated to the coating material in vaporized condition while retaining said mask pressed against said isolated portion by a magnetic force exerted through the article from behind the article so as to completely isolate the corresponding uncoated portion of said surface.

6. The process of coating an article with a pattern consisting in suspending the article beneath a support in an evacuated enclosure, vaporizing coating material and passing said coating material upwardly against a surface of said article while masking an isolated portion of said surface by a stencil or mask magnetically held beneath said surface and in direct contact therewith.

GILBERT E. PRIDE.

REFERENCES CITED

The following references are of record in the file of this patent:

UNITED STATES PATENTS

| Number | Name | Date |
|---|---|---|
| 1,915,631 | Truba et al. | June 27, 1933 |
| 2,077,442 | Tedham et al. | Apr. 20, 1937 |
| 2,103,623 | Kott | Dec. 28, 1937 |
| 2,160,714 | Biggs | May 30, 1939 |
| 2,239,770 | Becker et al. | Apr. 29, 1941 |
| 2,295,759 | Scheer | Sept. 15, 1942 |
| 2,337,329 | Hewlett | Dec. 21, 1943 |